US009224220B2

(12) United States Patent
Toyoda et al.

(10) Patent No.: US 9,224,220 B2
(45) Date of Patent: Dec. 29, 2015

(54) EYE IMAGE SIMULATION DEVICE, EYE IMAGE GENERATION METHOD, AND EYE IMAGE GENERATION PROGRAM

(75) Inventors: Naruhito Toyoda, Kanagawa (JP); Naoko Tani, Kanagawa (JP); Satoko Ishihara, Tokyo (JP)

(73) Assignee: SHISEIDO COMPANY, LTD., Tokyo (JP)

( * ) Notice: Subject to any disclaimer, the term of this patent is extended or adjusted under 35 U.S.C. 154(b) by 223 days.

(21) Appl. No.: 13/808,934

(22) PCT Filed: Jul. 8, 2011

(86) PCT No.: PCT/JP2011/065674
§ 371 (c)(1),
(2), (4) Date: Jan. 8, 2013

(87) PCT Pub. No.: WO2012/008374
PCT Pub. Date: Jan. 19, 2012

(65) Prior Publication Data
US 2013/0113832 A1 May 9, 2013

(30) Foreign Application Priority Data

Jul. 16, 2010 (JP) .................................. 2010-162040
Jul. 7, 2011 (JP) .................................. 2011-150985

(51) Int. Cl.
*G09G 5/00* (2006.01)
*G06T 11/20* (2006.01)
(Continued)

(52) U.S. Cl.
CPC ............... *G06T 11/203* (2013.01); *G06T 19/20* (2013.01); *G06F 3/0481* (2013.01);
(Continued)

(58) Field of Classification Search
CPC ......... G06T 11/60; G06T 19/00; G06T 11/00; G06T 15/04; G06T 11/001; G06T 15/005; G06T 1/60; G06F 9/4443; G06F 3/0481; G09G 5/363
USPC ......... 345/630, 646, 592, 629, 582, 619, 632, 345/441, 442; 382/128, 294, 117, 282, 203
See application file for complete search history.

(56) References Cited

U.S. PATENT DOCUMENTS 6,091,836 A * 7/2000 Takano ................ A45D 44/005
382/100
6,138,314 A * 10/2000 Schiff et al. .................. 15/167.1
(Continued)

FOREIGN PATENT DOCUMENTS

| JP | 2006-079619 | 3/2006 |
| JP | 2010-151697 | 7/2010 |

OTHER PUBLICATIONS

Watanabe. et al., A Trigonal Prism-Based Method for Hair image Generation, Jan. 1992.*

(Continued)

*Primary Examiner* — Abderrahim Merouan
(74) *Attorney, Agent, or Firm* — IPUSA, PLLC

(57) ABSTRACT

An eye image simulation device is provided that generates an eye image using information relating to an eyelash shape that is set up by a user. The eye image simulation device includes an eyelash generation unit that generates eyelashes with polygons using the information relating to the eyelash shape, a form alteration unit that alters a form that is configured by connecting the tips of the eyelashes generated by the eyelash generation unit, and a simulation image generation unit that generates the eye image using the eyelashes generated by the eyelash generation unit or the form altered by the form alteration unit.

16 Claims, 13 Drawing Sheets

(51) Int. Cl.

| | | |
|---|---|---|
| *G06T 19/20* | (2011.01) | |
| *G06F 3/0481* | (2013.01) | |
| *G06T 19/00* | (2011.01) | |
| *G06T 11/60* | (2006.01) | |
| *G06T 11/00* | (2006.01) | |
| *G06T 15/04* | (2011.01) | |
| *G06T 15/00* | (2011.01) | |
| *G06F 9/44* | (2006.01) | |
| *G09G 5/36* | (2006.01) | |
| *G06T 1/60* | (2006.01) | |

(52) U.S. Cl.
CPC ............... *G06F 9/4443* (2013.01); *G06T 1/60* (2013.01); *G06T 11/00* (2013.01); *G06T 11/001* (2013.01); *G06T 11/60* (2013.01); *G06T 15/005* (2013.01); *G06T 15/04* (2013.01); *G06T 19/00* (2013.01); *G06T 2219/2021* (2013.01); *G09G 5/363* (2013.01)

(56) References Cited

U.S. PATENT DOCUMENTS

| | | | | |
|---|---|---|---|---|
| 7,079,158 | B2 * | 7/2006 | Lambertsen | 345/630 |
| 7,123,753 | B2 * | 10/2006 | Takahashi et al. | 382/117 |
| 7,158,138 | B1 * | 1/2007 | Bronskill et al. | 345/441 |
| 7,436,987 | B2 * | 10/2008 | Takano et al. | 382/117 |
| 7,773,091 | B2 * | 8/2010 | Giron et al. | 345/582 |
| 8,345,933 | B2 * | 1/2013 | Cottard | G06K 9/00597 382/115 |
| 2002/0150287 | A1 * | 10/2002 | Kobayashi | 382/154 |
| 2003/0001851 | A1 * | 1/2003 | Bushey | 345/506 |
| 2003/0063794 | A1 * | 4/2003 | Rubinstenn et al. | 382/154 |
| 2004/0001614 | A1 * | 1/2004 | Russon et al. | 382/117 |
| 2004/0149303 | A1 * | 8/2004 | Kobayashi | 132/216 |
| 2004/0149313 | A1 | 8/2004 | Dawson et al. | |
| 2006/0055705 | A1 | 3/2006 | Giron et al. | |
| 2006/0188144 | A1 * | 8/2006 | Sasaki et al. | 382/154 |
| 2008/0211424 | A1 * | 9/2008 | Kimura | 315/277 |
| 2008/0253622 | A1 * | 10/2008 | Tosa et al. | 382/117 |
| 2009/0244098 | A1 * | 10/2009 | Tateishi | 345/646 |
| 2010/0054548 | A1 * | 3/2010 | Inada | 382/117 |
| 2010/0128032 | A1 * | 5/2010 | Kim et al. | 345/419 |
| 2010/0328307 | A1 * | 12/2010 | Lim | 345/420 |
| 2011/0227965 | A1 * | 9/2011 | Mori et al. | 345/690 |
| 2012/0163678 | A1 * | 6/2012 | Du et al. | 382/117 |
| 2012/0189160 | A1 * | 7/2012 | Kaneda et al. | 382/103 |

OTHER PUBLICATIONS

International Search Report mailed on Sep. 6, 2011.
iPad Muke Marketing Shien Business Shido Zasshi-fu Application Software, Kokoku Haishin Service mo Zokuzoku, Nikkei Net Marketing, No. 32, Mar. 25, 2010, No. 32, p. 8.
iLash Shokai Page/Matsuge Extension no Shofu, Shofu Inc., [retrieval date Aug. 24, 2011], Internet <URL:http://www.eyecosme.jp/user_data/ilash.php>.
Taiwanese Office Action dated Oct. 2, 2015.

* cited by examiner

FIG.1
Q. WHICH FINISH DO YOU PREFER?
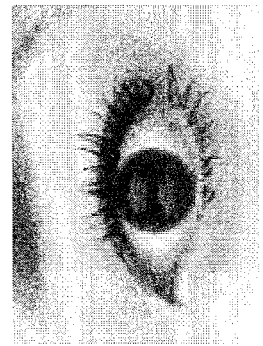
[TYPE L4]
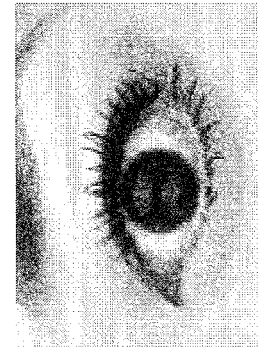
[TYPE V4]
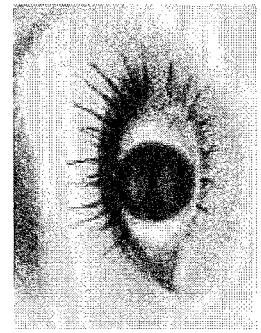
[TYPE L3]
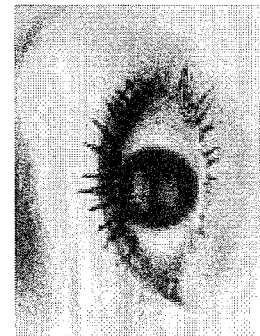
[TYPE V3]
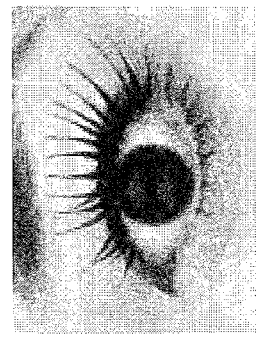
[TYPE L2]
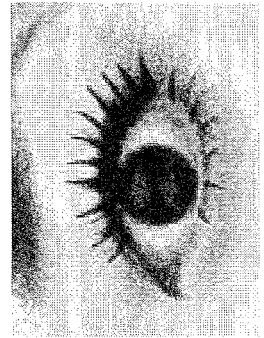
[TYPE V2]
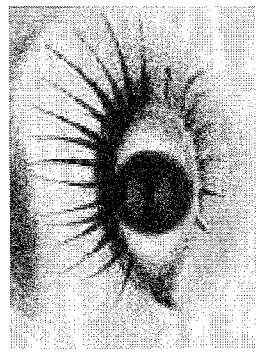
[TYPE L1]
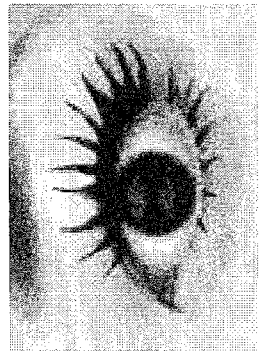
[TYPE V1]

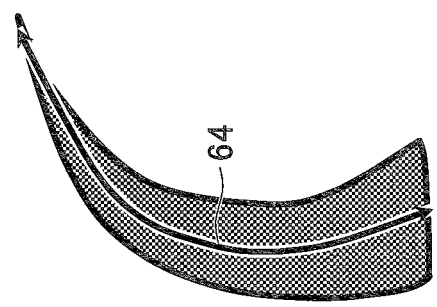
FIG.7A
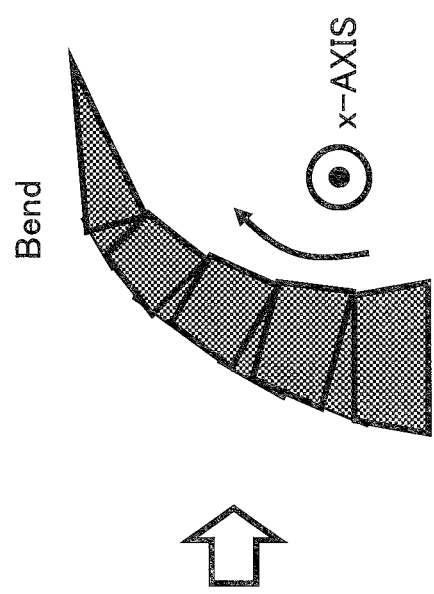
FIG.7B
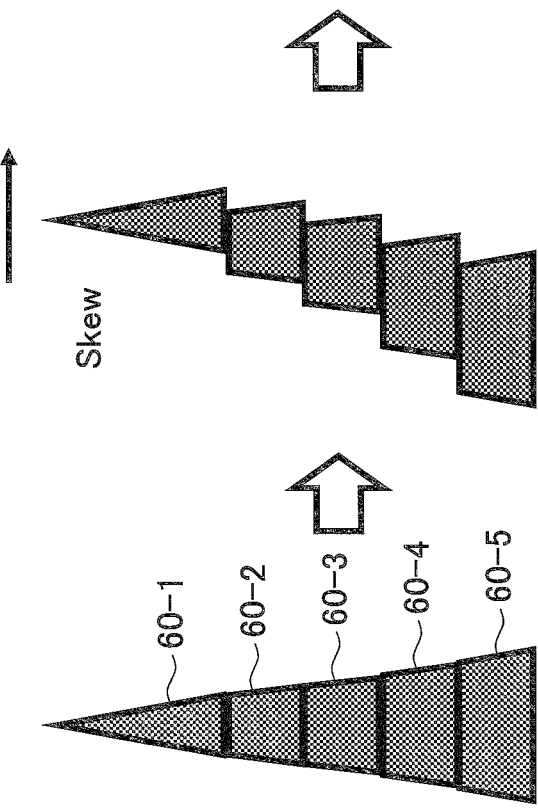
FIG.7C
FIG.7D

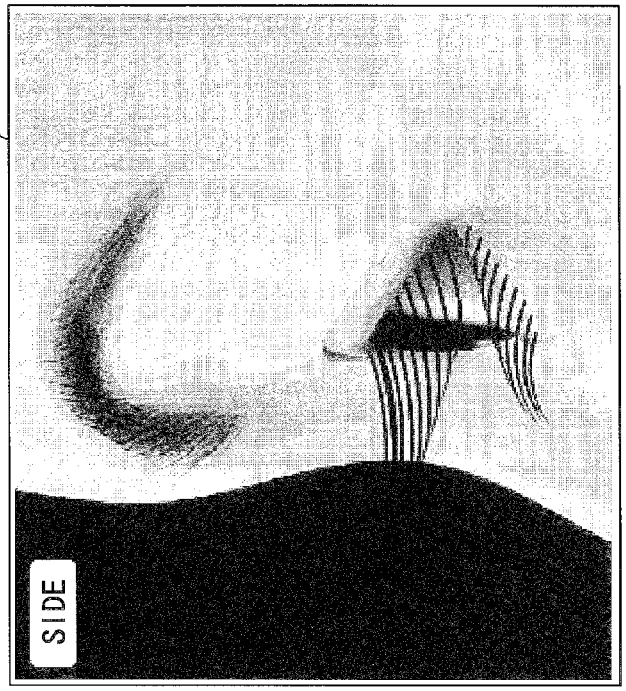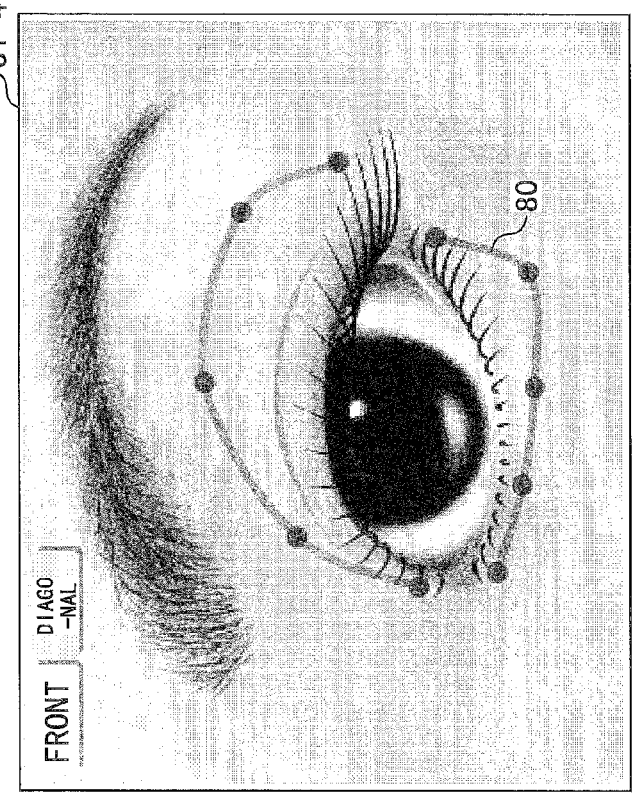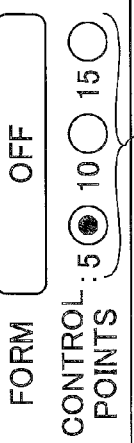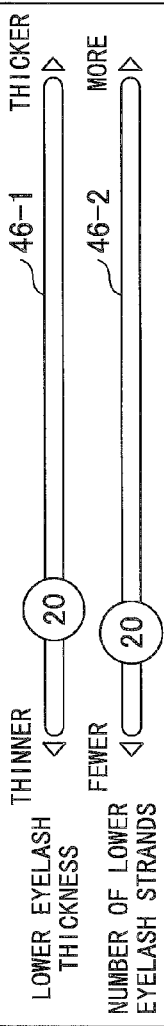
FIG.12

EYE IMAGE SIMULATION DEVICE, EYE IMAGE GENERATION METHOD, AND EYE IMAGE GENERATION PROGRAM

TECHNICAL FIELD

The present invention relates to an eye image simulation device, an eye image generation method, and an eye image generation program.

BACKGROUND ART

Eye makeup for changing an impression such as the tone, texture, and/or shape of the eye is becoming an indispensable item for females these years. Particularly, mascara is a highly popular eye makeup item across all generations since it can be applied directly to the eyelashes to dramatically change the impression of the eye. Thus, cosmetic product manufacturers are introducing various mascara products into the market.

Types of mascara may include a type that makes the eyelashes look longer, a type that makes the eyelashes look thicker, a type that makes the eyelashes look as though they have more strands, a type that enhances the curl of eyelashes, as well as various combinations of the above types, for example, and various finishes may be contemplated from applying these types of mascara. A desired finish may vary greatly depending on the preference of a user, and may be influenced by temporary changes such as the current mood of the user as well as long-term changes such as the season, the era, or the latest fashion trends, for example.

In designing a mascara product, the current trend needs to be determined based on actual trends and preferences of users taking the above changes into consideration. Also, a finish that may be favored by future users needs to be predicted and reflected in product design.

Conventional means used to survey mascara finish preferences include having a user describe an image of a mascara finish using adjectives, surveying preferences based on functional aspects such as length and volume according to the above different types of mascara, and surveying visual preferences by creating photographs of different finishes by combining various lengths and thicknesses and having a user select a preferred finish, for example. FIG. 1 show exemplary images used to survey mascara preferences. In FIG. 1, photographs of types L1-L4 with varying eyelash lengths and photographs of types V1-V4 with varying eyelash lengths and thicknesses are shown. Such photographs are presented to a user so that the user may select a preferred finish. User preferences may be determined based on the selection results of plural users, for example.

Also, a technique is known for simulating a visual appearance of the eyelashes by changing certain parameters such as the curvature and length of the eyelashes. (See, e.g., Patent Document 1)

Patent Document 1: Japanese Laid-Open Patent Publication No. 2006-79619

In the case of having an image of a mascara finish described in words, the survey result is abstract and cannot be easily developed into concrete data. Unless concrete data with specific values for the thickness and length of the eyelashes can be obtained, reflection of the preference survey results on product design may be difficult.

In the survey using photographs as described above, the photographs are not created by continuously changing values representing the eyelash shape. Since there is no continuity in the change in the eyelash shape in the photographs, only one preferred shape may be pinpointed in such a survey. That is, a preference with a certain range cannot be obtained so that an acceptable design range cannot be determined, for example.

Also, there is a limit to the number of photographs that can be presented to a person during one survey session considering the burden on the person being surveyed and the fact that the reliability of the survey may be sacrificed due to fatigue of the person being surveyed. Thus, it is difficult to conduct a survey involving the presentation of a large number of photographs covering all aspects of preferences. Further, in the case of preparing a large number of photographs reflecting numeric value changes, a significant amount of time and resources may be required to create these photographs.

On the other hand, the technique disclosed in Patent Document 1 is for increasing sales at retail stores that sell items directly to customers. Patent Document 1 does not describe specific methods for numerically analyzing user preferences with respect to mascara finishes based on simulated visual appearances of the eyelashes. Thus, a technique is desired for conducting a preference survey in quantifiable terms.

SUMMARY OF THE INVENTION

Means for Solving the Problem

It is a general object of at least one embodiment of the present invention to provide an eye image simulation device, an eye image generation method, and an eye image generation program that substantially obviate one or more problems caused by the limitations and disadvantages of the related art. It is one particular object of at least one embodiment of the present invention to provide an eye image simulation device, an eye image generation method, and an eye image generation program for generating an eye image by freely varying the eyelash shape and surveying user preferences with respect to a mascara finish based on the generated eye image.

In one embodiment of the present invention, an eye image simulation device is provided that generates an eye image using information relating to an eyelash shape that is set up by a user. The eye image simulation device includes an eyelash generation unit that generates eyelashes with polygons using the information relating to the eyelash shape, a form alteration unit that alters a form that is configured by connecting the tips of the eyelashes generated by the eyelash generation unit, and a simulation image generation unit that generates the eye image using the eyelashes generated by the eyelash generation unit or the form altered by the form alteration unit.

In another embodiment of the present invention, an eye image generation method is provided that is executed by an eye image simulation device that generates an eye image using information relating to an eyelash shape that is set up by a user. The eye image generation method includes an eyelash generation step of generating eyelashes with polygons using the information relating to the eyelash shape, a form alteration step of altering a form that is configured by connecting the tips of the eyelashes generated by the eyelash generation unit, and a simulation image generation step of generating the eye image using the eyelashes generated by the eyelash generation unit or the form altered by the form alteration unit.

In another embodiment of the present invention, an eye image generation program is provided for generating an eye image using information relating to an eyelash shape that is set up by a user. The eye image program includes computer executable code for causing a computer to function as an eyelash generation unit that generates eyelashes with polygons using the information relating to the eyelash shape, a form alteration unit that alters a form that is configured by connecting the tips of the eyelashes generated by the eyelash generation unit, and a simulation image generation unit that generates the eye image using the eyelashes generated by the eyelash generation unit or the form altered by the form alteration unit.

According to an aspect of the present invention, the eyelash shape may be freely changed to generate an eye image, and user preferences with respect to a mascara finish may be surveyed based on the generated eye image.

BRIEF DESCRIPTION OF THE DRAWINGS

Other objects and further features of embodiments will be apparent from the following detailed description when read in conjunction with the accompanying drawings, in which:

FIG. 1 is a diagram showing exemplary images used in a conventional mascara preference survey;

FIGS. 7A-7D are diagrams illustrating the eyelash curl;

FIG. 12 is a diagram illustrating an exemplary manner of altering parameters of the curvature of the lower eyelashes.

EMBODIMENTS FOR IMPLEMENTING THE INVENTION

In the following, embodiments of the present invention are described with reference to the accompanying drawings.

<Eye Image Simulation Device: Functional Configuration>

Figure 2:
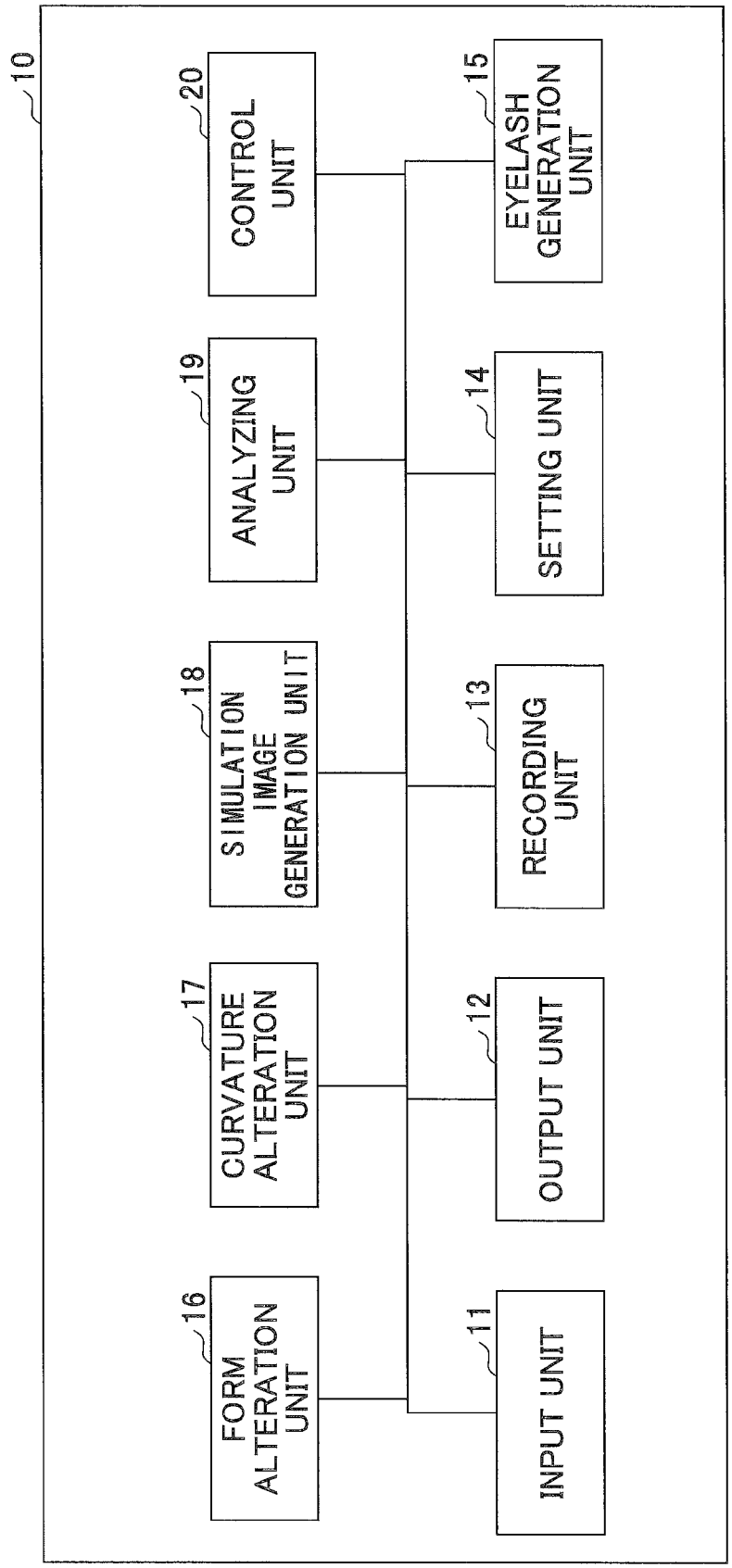
FIG. 2 is a block diagram showing a functional configuration of an eye image simulation device according to an embodiment of the present invention.

FIG. 2 is a block diagram showing an exemplary functional configuration of an eye image simulation device 10 according to an embodiment of the present invention. In the present embodiment, the eye portion of the face corresponds to an imaging object, and the eye image simulation device 10 is configured to enable the shape of the eyelashes of the imaged eye portion to be freely changed. It is noted that the eyelashes include both upper eyelashes and lower eyelashes.

Parameters used to define the eyelash shape may include attributes such as the eyelash length, the eyelash thickness, the curvature of the eyelashes when they are curled, the number of eyelash strands, and the eyelash form, which is configured by connecting the tips of plural eyelashes such as the upper eyelashes from the inner corner of the eye to the outer corner of the eye, for example. These parameters are subject to control in the present embodiment. Such quantified data relating to the eyelashes may be effectively used in designing product features, for example.

Also, according to surveys on actual usage, rather than arranging the eyelashes all in the same length and direction, a user may desire a finish that has different accents on different parts of the eyelashes such as making the eyelashes towards the outer corner of the eye look longer, making the center of the eye look large, or giving a shaper angle at the outer corner of the eye, for example. Accordingly, the curvature at each section of the eye and the form connecting the tips of the eyelashes may be important factors for determining a user preference.

As is shown in FIG. 2, the eye image simulation device 10 includes an input unit 11, an output unit 12, a recording unit 13, a setting unit 14, an eyelash generation unit 15, a form alteration unit 16, a curvature alteration unit 17, a simulation image generation unit 18, an analyzing unit 19, and a control unit 20.

The input unit 11 may be a pointing device or a touch panels such as a keyboard and a mouse that are configured to accept various user command inputs such as a start command and an end command, for example. The input unit 11 may also accept inputs of various setting information relating to the eyelash shape that is set up by the user, for example.

It is noted that setting information relating to the eyelash shape may include parameter information such as the eyelash thickness, the eyelash length, the curvature of the eyelashes when they are curled, the number of eyelash strands, and the eyelash form, for example.

The output unit 12 may be a display including a display screen, for example, and is configured to output and display information such as that relating to an input made via the input unit and resulting information reflecting the input information. For example, the output unit 12 may display the eyelashes generated by the eyelash generation unit 15, the form altered by the form alteration unit 16, the eyelashes with the curvature altered by the curvature alteration unit 17, or the eye image generated by the simulation image generation unit 18.

The recording unit 13 records various types of data such as the setting information relating to the eyelash shape that is set up by the user, information relating to a polygon with a predetermined shape such as a cone shape, and eye-related information for displaying a background image of the eye image without the eyelashes including information on the eye color, the skin color, the eyebrow shape, and the eyelid shape, for example. The recording unit 13 may also read the recorded data as is necessary.

The setting unit 14 obtains setting information relating to the eyelash shape that is set up by a user via a display screen, and records the setting information in the recording unit 13. It is noted that although the setting information relating to the eyelash shape is arranged to include information on at least one of the eyelash thickness, the eyelash length, the curvature of the eyelashes when they are curled, the number of eyelash strands, and the eyelash form in the present embodiment, the present invention is not limited to such case. The setting information may be used as parameters for configuring the eyelash shape, for example.

The eyelash generation unit 15 uses the setting information relating to the eyelash shape that is set up by the setting unit 14 to generate an eyelash with a polygon having a predetermined shape such as a cone shape. It is noted that the manner of generating the eyelash with a polygon having a predetermined shape such as a cone shape is described in detail below.

The form alteration unit 16 determines whether the form that is configured by connecting the tips of plural eyelashes such as the upper eyelashes from the inner corner of the eye to the outer corner of the eye generated by the eyelash generation unit 15 has been altered by the user. If the form has been altered, the form alteration unit 16 obtains information on the form altered by the user, and alters the eyelash length and the eyelash direction (angle on a horizontal plane) based on the information on the altered form. It is noted that the eyelash form and the manner of altering the eyelash form are described in detail below.

The curvature alteration unit 17 alters the curvature of at least one section of the upper eyelashes or the lower eyelashes that have been curled section by section. The curvature defines the curl shape of the eyelashes when they are curled, and the curvature alteration unit 17 may alter the curvature of at least one section of the upper eyelashes or lower eyelashes generated by the eyelash generation unit 15 or the upper eyelashes or lower eyelashes of the altered form generated by the form alteration unit 16. For example, the curvature alteration unit 17 may divide the upper eyelashes or the lower eyelashes into a root section, a center section, and a tip section, and alter the curvature of at least one of the root section, the center section, and the tip section.

By representing the attributes of the eyelashes such as the eyelash length, the eyelash thickness, the curvature of the eyelashes when they are curled, the number of eyelash strands, and the eyelash form using polygons with a predetermined shape such as a cone shape, the eyelash shape may be freely altered. Also, by assigning numeric values to the attributes configuring the eyelash shape, visual preferences for the eyelash appearance (mascara preferences) may be quantified.

The simulation image generation unit 18 generates an eye image using the eyelashes generated by the eyelash generation unit 15 or the form altered by the form alteration unit 16. Also, the simulation image generation unit 18 may generate the eye image using the curvature altered by the curvature alteration unit 17.

In this case, the simulation image generation unit 18 generates a background image of the eye image using eye-related information recorded in the recording unit 13. The eye-related information for displaying the background image may describe features of the eye other than the eyelashes such as the eye color, the skin color, the eyebrow shape, and the eyelid shape, for example. The generated eyelashes and eyelash form may be superposed on the generated background image to generate the eye image.

The simulation image generation unit 18 may also generate the eye image by altering the eye color, the skin color, and/or the shape of the eyelids from single-edged eyelids to double-edged eyelids, for example. Also, the simulation image generation unit 18 may generate eye images as viewed from different angles such as a front view, a 30-degree diagonal view, and a side view. Further, the simulation image generation unit 18 may generate eye images of different aspects by adjusting the degree of openness or blinking of the eye, for example.

In this way, a finish reflecting the numeric values of the attributes configuring the shape of the eyelashes set up by the user may be displayed, and the finish may be viewed from various angles.

The analyzing unit 19 analyzes the eyelash shape through numerical analysis based on the eye image generated by the simulation image generation unit 18. That is, the analyzing unit 19 quantifies user preferences for a mascara finish based on the numeric values describing the eyelash shape. It is noted that the manner in which the analyzing unit 19 analyzes the numeric values of the eyelash shape is described in detail below.

In designing a mascara product, actual user trends and preferences for a mascara finish may be determined based on the quantified numerical analysis results obtained in the above manner. Also, in addition to determining the current trends and preferences, a finish that may be favored by future users may be predicted based on the amount of change in the numeric values over time and the characteristics of the change, and such predictions may be reflected in the product design.

The control unit 20 performs overall control operations of the functional units of the eye image simulation device 10. For example, the control unit 20 may perform control operations to prompt the eyelash generation unit 15 to generate eyelashes using information relating to the eyelash shape set up by the user, and prompt the form alteration unit 16 to alter the eyelash form.

<Eye Image Simulation Device: Hardware Configuration>

In the following, an exemplary hardware configuration of the eye image simulation device 10 is described with reference to FIG. 3.

Figure 3:
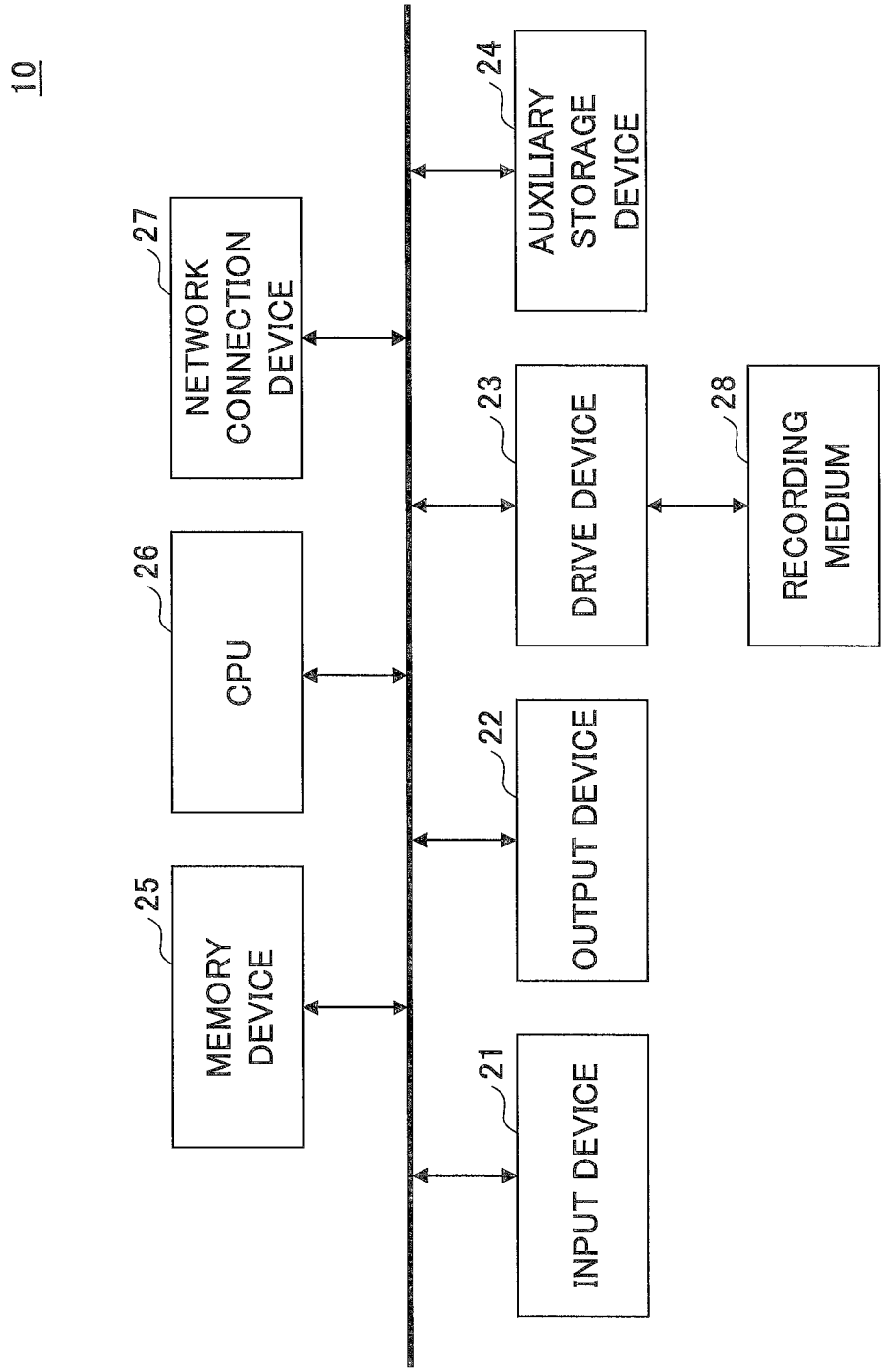
FIG. 3 is a block diagram showing an exemplary hardware configuration of the eye image simulation device.

In FIG. 3, the eye image simulation device 10 includes an input device 21, an output device 22, a drive device 23, an auxiliary storage device 24, a memory device 25, a central processing unit (CPU) 26, a network connection device 27, and a storage medium 28 that are connected to each other via a bus B.

It is noted that the devices making up the eye image simulation device 10 may be accommodated within one box structure, or may alternatively be divided into plural box structures.

The input device 21 may include a pointing device such as a keyboard or a mouse that is operated by a user and/or a touch panel that is operated by the user, for example. The input device 21 is used by the user to input various operational commands including a command to execute an eye image generation program.

The output device 22 includes a display for displaying various data and windows for operating a computer that is used to execute a process according to the present embodiment. For example, the output device 22 may display the progress or result of executing the eye image generation program based on a control program included in the CPU 26.

Execution programs including the eye image generation program may be provided by the recording medium 28 such as a CD-ROM. The recording medium 28 may be loaded in the drive device 23 so that the execution programs included in the recording medium 28 may be installed in the auxiliary storage device 24 via the drive device 23.

It is noted that various types of recording media may be used as the recording medium 28 of the programs including recording media that optically, electrically, or magnetically records information such as a CD-ROM, a flexible disk, and a magnetic disk (MO); and a semiconductor memory that electrically records information such as a ROM (read-only memory) and a flash memory.

The auxiliary storage device 24 may be a hard disk, for example, and is configured to store various programs including execution programs such as the eye image generation program and control programs for executing computer control operations, and various files and data for executing such programs. The auxiliary storage device 24 may input and output such programs, files, and data as is necessary.

The memory device 25 stores an execution program that is read from the auxiliary storage device 24 by the CPU 26. It is noted that the memory device 25 may be a ROM or a RAM (random access memory), for example.

The CPU 26 controls overall computer operations such as data input and output operations between various functional units and hardware components based on control programs of the OS (operating system) and execution programs such as the eye image generation program stored in the memory device 25, for example. Also, the CPU 26 may obtain various items of information that may be required during execution of a program from the auxiliary storage device 24 and store such information, for example.

The network connection device 27 may establish connection with a communication network to obtain an execution program such as the eye image generation program from another terminal that is connected to the communication network or transmit the results of executing a program or the actual program such as the eye image generation program to another terminal that is connected to the communication network, for example.

With the above hardware configuration, an eye image generation process according to the present embodiment may be realized efficiently at low cost without requiring any special arrangements. Also, the eye image generation process according to the present embodiment may be easily realized by installing a corresponding program.

It is noted that the above hardware configuration may be realized by a general-purpose PC (personal computer), for example. However, the present invention is not limited to such an example. For example, the program for realizing the eye image generation process according to the present embodiment may be installed in a server that is connected to the general-purpose PC via a communication network such as the Internet, and the general-purpose PC may execute the eye image generation process by having the network connection device 27 access the server from a pre-designated URL using a web browser.

<Eye Image Generation Process>

Figure 4:
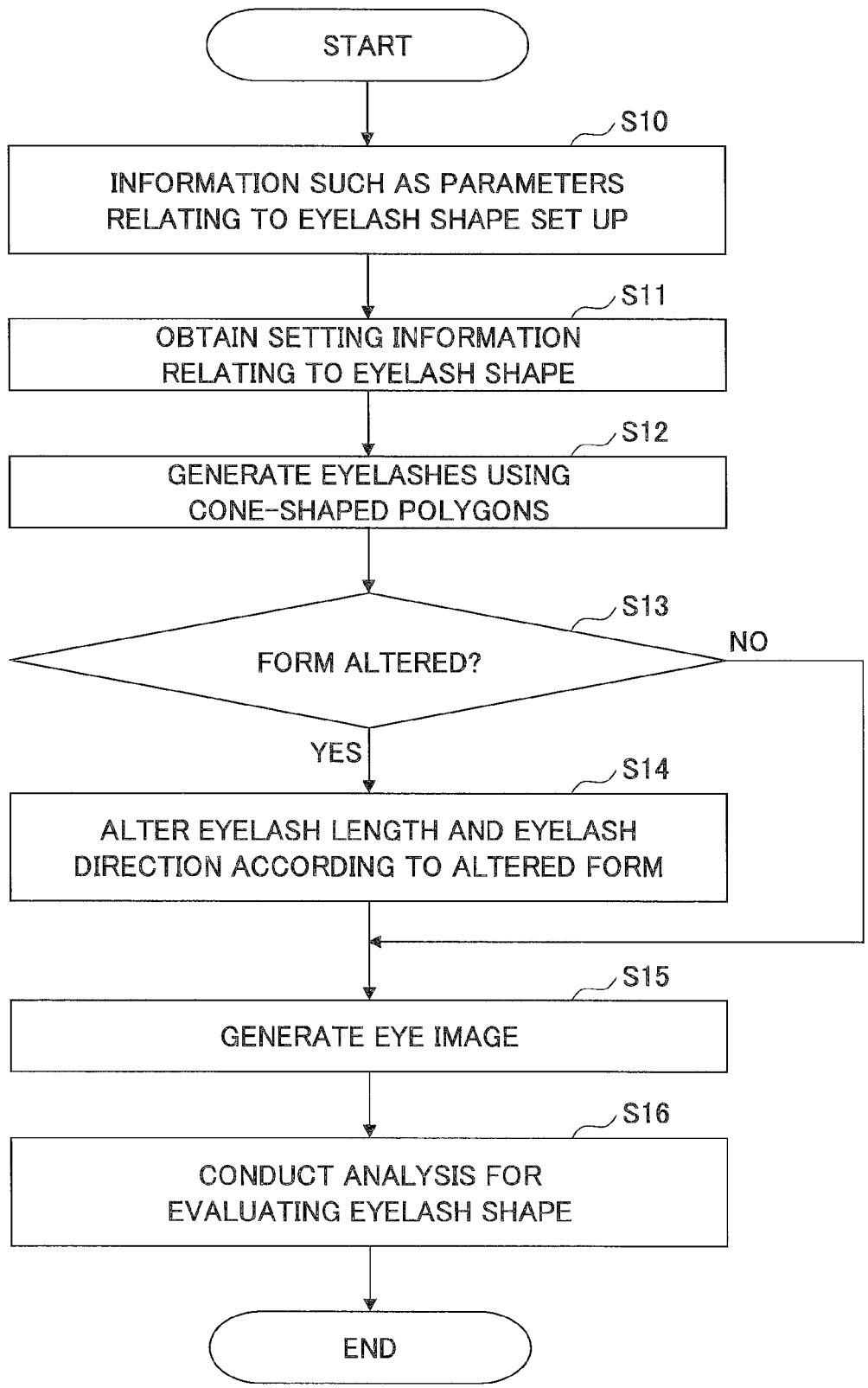
FIG. 4 is a flowchart showing process steps of an eye image generation process according to an embodiment of the present invention.

In the following, the eye image generation process according to the present embodiment is described with reference to FIG. 4. FIG. 4 is a flowchart showing process steps of the eye image generation process according to the present embodiment.

In FIG. 4, when information such as parameters relating to the eyelash shape displayed on a display screen are set up by a user (S10), the setting unit 14 obtains the setting information relating to the eyelash shape that has been set up by the user (S11).

Then, based on the setting information relating to the eyelash shape that is set up in step S11, the eyelash generation unit 15 generates eyelashes using polygons having a predetermined shape such as a cone shape (S12).

Then, the form alteration unit 16 determines whether a fault configured by connecting the tips of plural eyelashes generated in step S12 such as the upper eyelashes from the inner corner or the eye to the outer corner of the eye has been altered by the user via the display screen (S13).

When the form alteration unit 16 determines that the form has been altered by the user (S13, YES), it obtains information on the altered form and alters the eyelash length and eyelash direction according to the altered foam (S14).

When the form alteration unit 16 determines that the form has not been altered (S13, NO), the process proceeds to step S15.

The simulation image generation unit 18 generates an eye image including the eyelashes generated in step S12 or the form altered in step S14 (S15). It is noted that the simulation image generation unit 18 may generate the eye image using a curvature altered by the curvature alteration unit 17 after step S12 or S14.

Then, the analyzing unit 19 conducts analyses including a numerical analysis for evaluating the eyelash shape based on the eye image generated in step S15 (S16), and ends the process.

<Exemplary Display Screen of Simulation Device>

Figure 5:
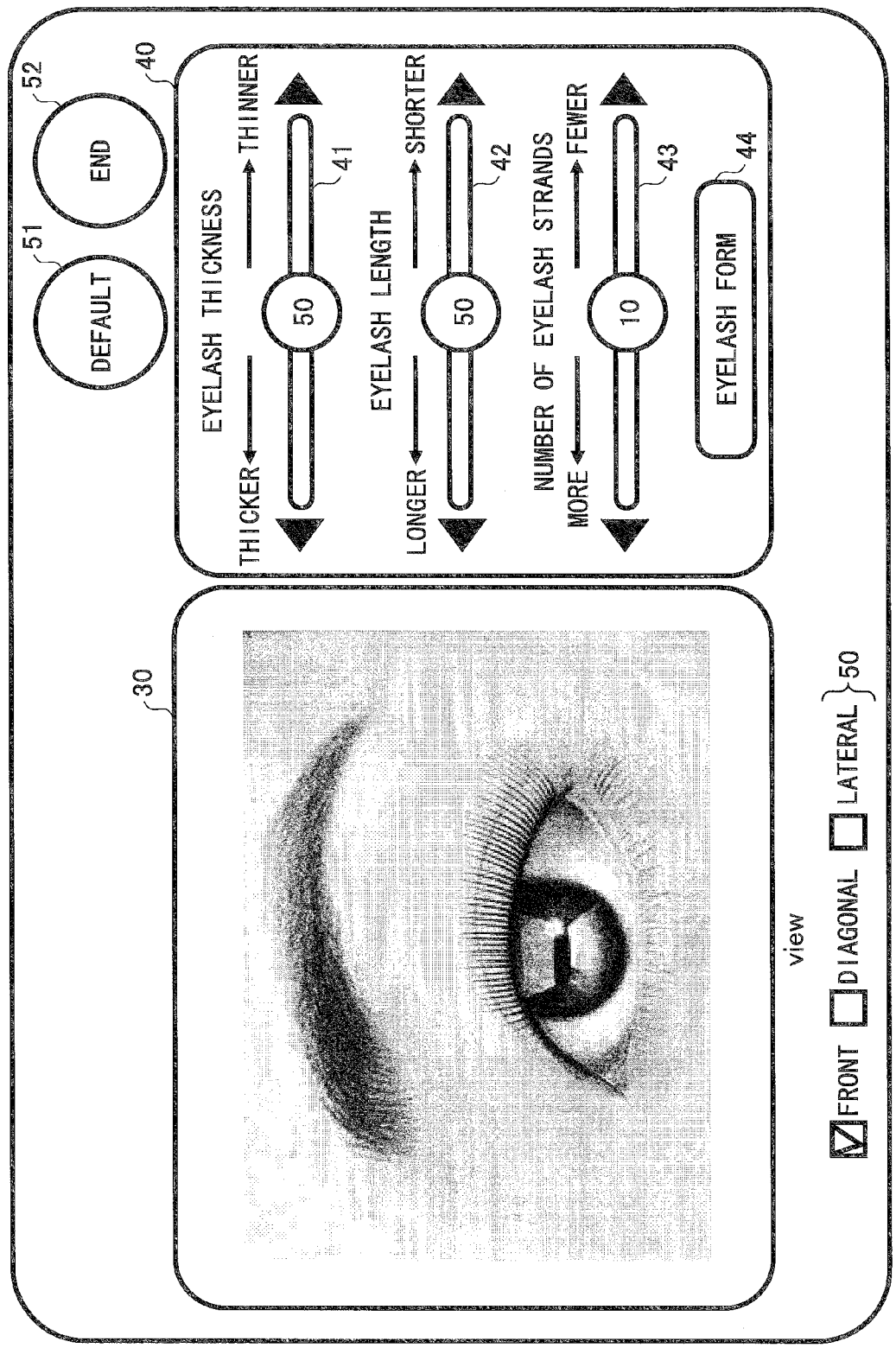
FIG. 5 is a diagram showing an exemplary display screen of the eye image simulation device.

In the following, the display screen of the eye image simulation device 10 is described with reference to FIG. 5. FIG. 5 is a diagram showing an exemplary display screen of the eye image simulation device 10.

In FIG. 5, the display screen of the eye image simulation device 10 includes an eye image display region 30 and an eyelash shape setting region 40. The eye image display region 30 displays an eye image generated by the simulation image generation unit 18 that includes the eyelashes generated by the eyelash generation unit 15 based on the setting information set up at the eyelash shape setting region 40.

It is noted that the eye image display region 30 also displays eye-related information relating to the eye background image including the eye color, the skin color, the eyebrows, and the eyelids, for example.

The eyelash shape setting region 40 includes a thickness setting region 41 for setting up the eyelash thickness, a length setting region 42 for setting up the eyelash length, a strand number setting region 43 for setting up the number of eyelash strands, and a form setting region for setting up the form of the eyelashes. It is noted that the eyelash shape setting region 40 may also include a curl (curvature) setting region for setting up the curvature of the eyelash curl.

As is shown in FIG. 5, numeric values representing the attributes of the eyelashes displayed in the eye image display region 30 are indicated in the thickness setting region 41, the length setting region 42, and the strand number setting region 43. When at least one of the arrows displayed in these setting regions is selected by the user, the corresponding numeric value(s) may be altered accordingly and eyelashes with a thickness, length, and/or number of strands corresponding to the altered numeric value(s) may be displayed on the eye image display region 30.

Also, when the form setting region 44 is selected, a form defined by connecting the tips of the eyelashes shown in the eye image display region 30 may be configured using a predetermined function such as the spline and the form may be depicted on the eye image display region 30. It is noted that the manner of altering the eyelash form using a predetermined function such as the spline is described in detail below.

As is described above, by enabling the attributes of the eyelash shape to be set up via the eyelash shape setting region 40, attributes such as the number of eyelash strands, the length, the thickness, and the curvature of the eyelashes may be freely altered, for example.

Also, the display screen includes a view selection region 50 arranged below the eye image display region 30. The view selection region 50 enables selection of a certain view such as "front," "diagonal," or "lateral," for example. In this way, the eye image display region 30 may display eye images of different views such as a front view, a 30-degree diagonal view, and a lateral view (side view) according to the view selected at the view selection region 50. Such an arrangement may provide a more thorough view of a finish, for example.

Also, the display screen includes a default selection region 51 and an end selection region 52 arranged above the eyelash shape setting region 40. When the default selection region 51 is selected, corresponding default values that are set up for the various attributes of the eyelash shape may be displayed at the corresponding setting regions such as the thickness setting region 41, the length setting region 42, and the strand number setting region 43, and eyelashes with attributes corresponding to the default numeric values may be generated and displayed at the eye image display region 30.

Also, when the end selection region 52 is selected, the display screen may be closed.

As is described above, by using the eye image simulation device 10, a mascara finish may be quantified, numerically analyzed, specifically comprehended, and described by images that may be easily shared through a PC or online via a server so that a straightforward visual preference survey that does not involve the use of words may be conducted.

<Length, Thickness, Strand Number Parameters>

In the following, length, thickness, and strand number parameters are described with reference to FIGS. 6A and 6B. As is described above, the eyelash generation unit 15 generates eyelashes using polygons of a predetermined shape such as a cone shape based on the setting information relating to the eyelash shape that is set up by the user. It is noted that the predetermined shape of the polygon may be any polygonal shape such as a cylindrical shape, a polygonal prism shape, a cone shape with a tip arranged into a spherical face or a flat face, or a cone shape with a side face having some curvature, for example.

In the following descriptions, a cone-shaped polygon 60 is used as an example.

Figure 6B:
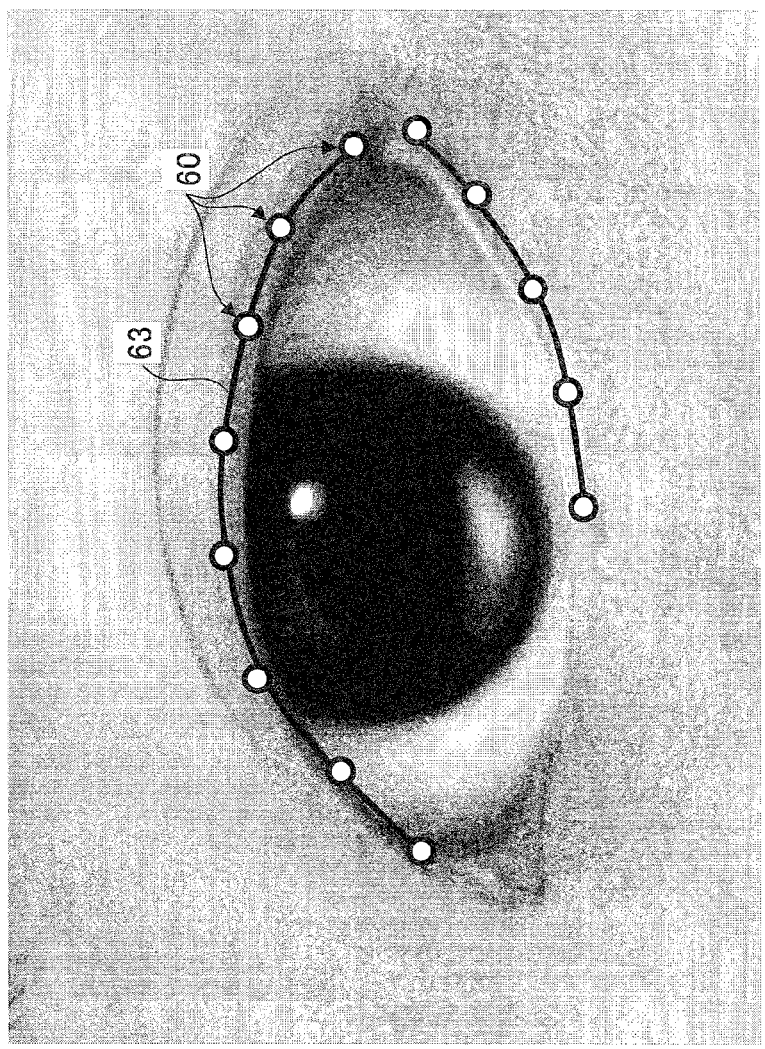
FIGS. 6A and 6B are diagrams illustrating parameters of the eyelash length, the eyelash thickness, and the number of eyelash strands.
Figure 6A:
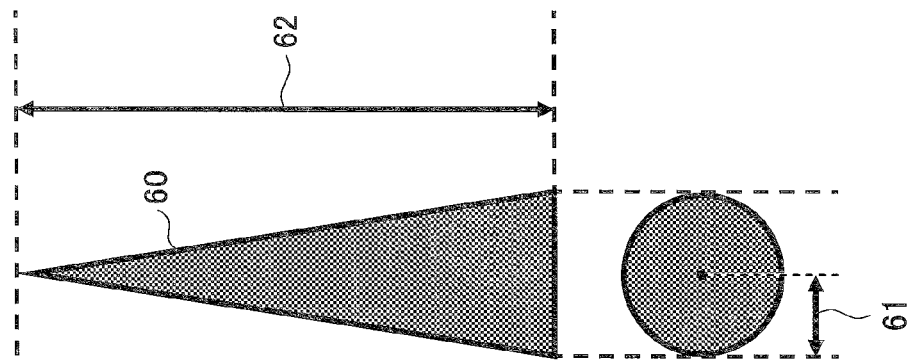

As is shown in FIG. 6A, the eyelash generation unit 15 generates eyelashes by adjusting the parameters of the polygon 60 that determines the attributes of the eyelash shape such as the eyelash thickness, length, and number of strands according to the setting information.

That is, the eyelash generation unit 15 represents the eyelash thickness by adjusting the value of the radius 61 of the bottom face of the cone-shaped polygon 60. For example, when the thickness is adjusted to "70" at the thickness setting region 41, a value for the radius 61 corresponding to the thickness "70" is input and the eyelash thickness is adjusted accordingly.

Also, the eyelash generation unit 15 represents the eyelash length by adjusting the value of the height 62 of the cone-shaped polygon 60.

It is noted that the shape of the bottom face of the cone-shaped polygon 60 may be circular or oval. In the latter case, values of the longer radius and the shorter radius may be adjusted to alter the thickness of the eyelashes.

Further, as is shown in FIG. 6B, the eyelash generation unit 15 arranges a number of eyelashes designated by the user on an eye background image that is prepared beforehand. For example, the eyelash generation unit 15 may arrange a corresponding number of the polygons 60 equidistantly along a line 63 extending across the edge of the upper eyelid from the inner corner of the eye to the outer corner of the eye. That is, the number of polygons 60 arranged equidistantly along line 63 by the eyelash generation unit 15 corresponds to the number of eyelashes designated by the user.

It is noted that when the number of eyelashes is increased or decreased by the user, the eyelash generation unit 15 reallocates the positions of the eyelashes so that the increased/decreased number of eyelashes may be arranged equidistantly along line 63 and depicts the cone-shaped polygons 60 at the corresponding positions. It is noted that the eyelash generation unit 15 may also depict eyelashes at the lower eyelid by arranging the cone-shaped polygons 60 equidistantly along a line extending from the outer corner of the eye to the center of the lower eyelid, for example.

Also, it is noted that although the RGB values of the cone-shaped polygons 60 are set equal to "0" as initial values so that the cone-shaped polygons 60 are depicted in a black color, the color of the cone-shaped polygons 60 may be adjusted to some other color. For example, glossiness of the cone-shaped polygon 60 may be represented by altering pre-designated lighting setting values. Also, to reproduce a more complex gloss such as a pearlescent color or interfering light, an image (texture) depicting such color may be prepared beforehand and the color may be represented using a texture mapping function, for example.

<Eyelash Curl>

In the following, the eyelash curl is described with reference to FIGS. 7A-7D. It is noted that FIGS. 7A-7D illustrate process steps for configuring an eyelash curl with the cone-shaped polygon 60.

As is shown in FIG. 7A, in the present embodiment, it is assumed that the cone-shaped polygon 60 is divided into elements 60-1 to 60-5 by parallel cross-sections that are spaced apart at equal distances over a length from the bottom face to the tip of the cone-shaped polygon 60 when the cone-shaped polygon 60 is disposed perpendicular to the display screen with its tip facing forward and its bottom face facing backward.

As is shown in FIG. 7B, sliding the elements 60-1 to 60-5 towards the upper direction of y-coordinates (i.e., horizontal direction in FIG. 7B, or up-down directions with respect to bottom face) is referred to as "Skew" in the present embodiment. Also, as is shown in FIG. 7C, assuming that the cone-shaped polygon 60 has an axis parallel to an x-axis (left-right horizontal direction with respect to bottom face) that passes through the center of each of the elements 60-1 to 60-5, turning the axis to give it some angle (curvature) is referred to as "Bend" in the present embodiment.

In the present embodiment, the eyelash curl is represented by the cone-shaped polygon 60 using the values of the "Skew" and "Bend" of the cone-shaped polygon 60 as parameters of the eyelash curl. It is noted that when the eyelashes are curled in the above-described manner, the eyelash length also changes. Accordingly, as is shown in FIG. 7D, a distance of a line extending from the tip of the cone-shaped polygon 60 to the center of the bottom face of the cone-shaped polygon 60 that passes through the centers of the elements 60-1 to 60-5 is obtained and the obtained distance is redefined as length 64 of the eyelashes.

Figure 8:
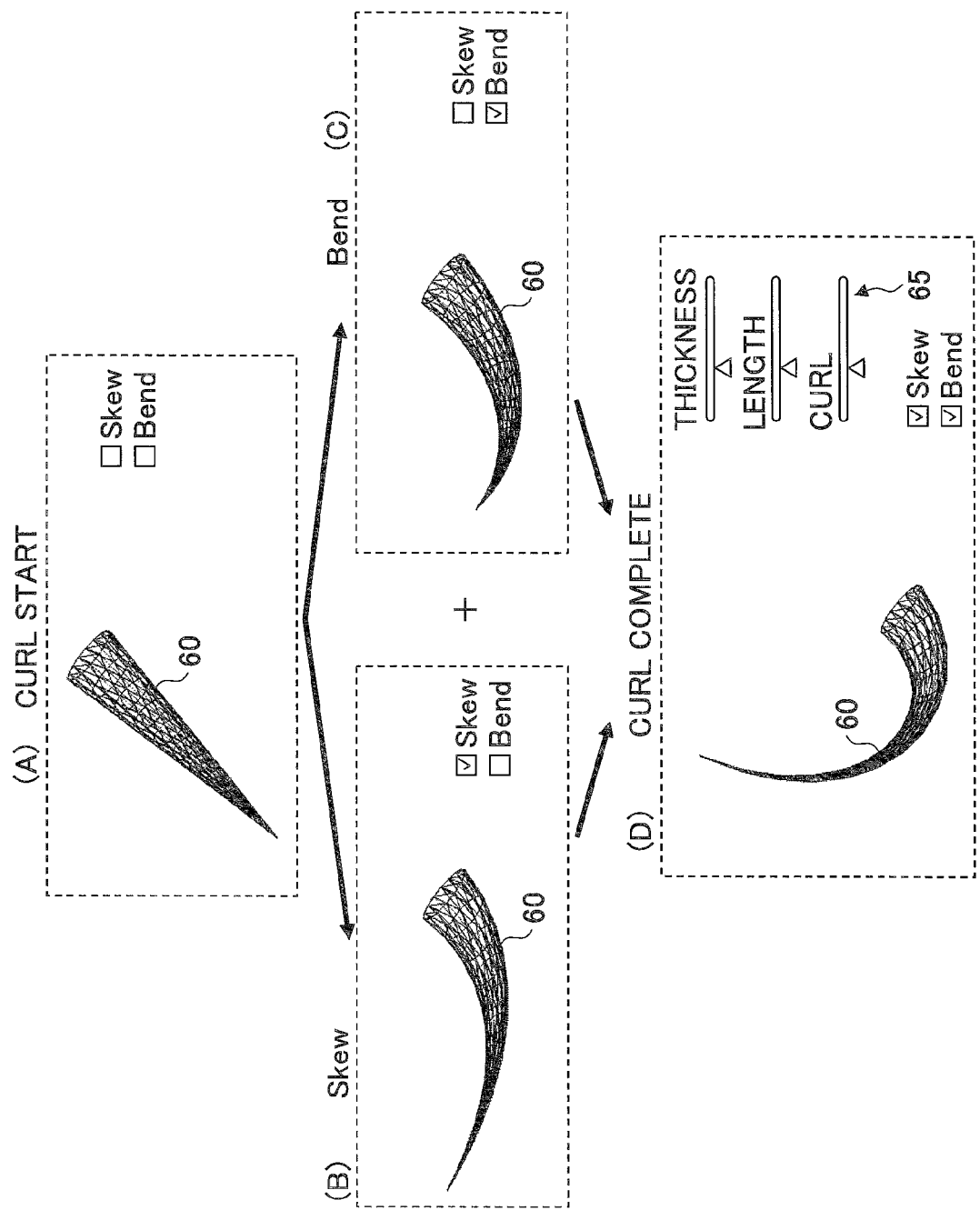
FIG. 8 is a diagram illustrating an exemplary manner of generating the eyelash curl with a cone-shaped polygon.

FIG. 8 is a diagram illustrating an exemplary manner of generating an eyelash curl using the cone-shaped polygon 60. In FIG. 8 (A), the cone-shaped polygon 60 before being curled is shown on the display screen. By selecting the check box next to the items "Skew" or "Bend," an eyelash curl corresponding to the selected adjustment may be generated.

FIG. 8 (B) shows the cone-shaped polygon 60 when "Skew" is selected at the display screen. FIG. 8 (C) shows the cone-shaped polygon 60 when "Bend" is selected at the display screen. That is, the cone-shaped polygon 60 representing the eyelash curl corresponding to the type of adjustment selected at the display screen of FIG. 8 (A) is displayed on the display screen.

Then, a display screen as is shown in FIG. 8 (D) may be used to adjust the curvature of the eyelash curl. For example, a user may select a curvature of the eyelash curl using a curl setting region 65 for adjusting the curvature of the eyelash curl displayed on the display screen, and the eyelash generation unit 15 may reflect parameters of the curvature of the eyelash curl selected by the user in the cone-shaped polygon 60 representing a predetermined eyelash curl. In this way, the eyelash curl may be freely altered.

Figure 9:
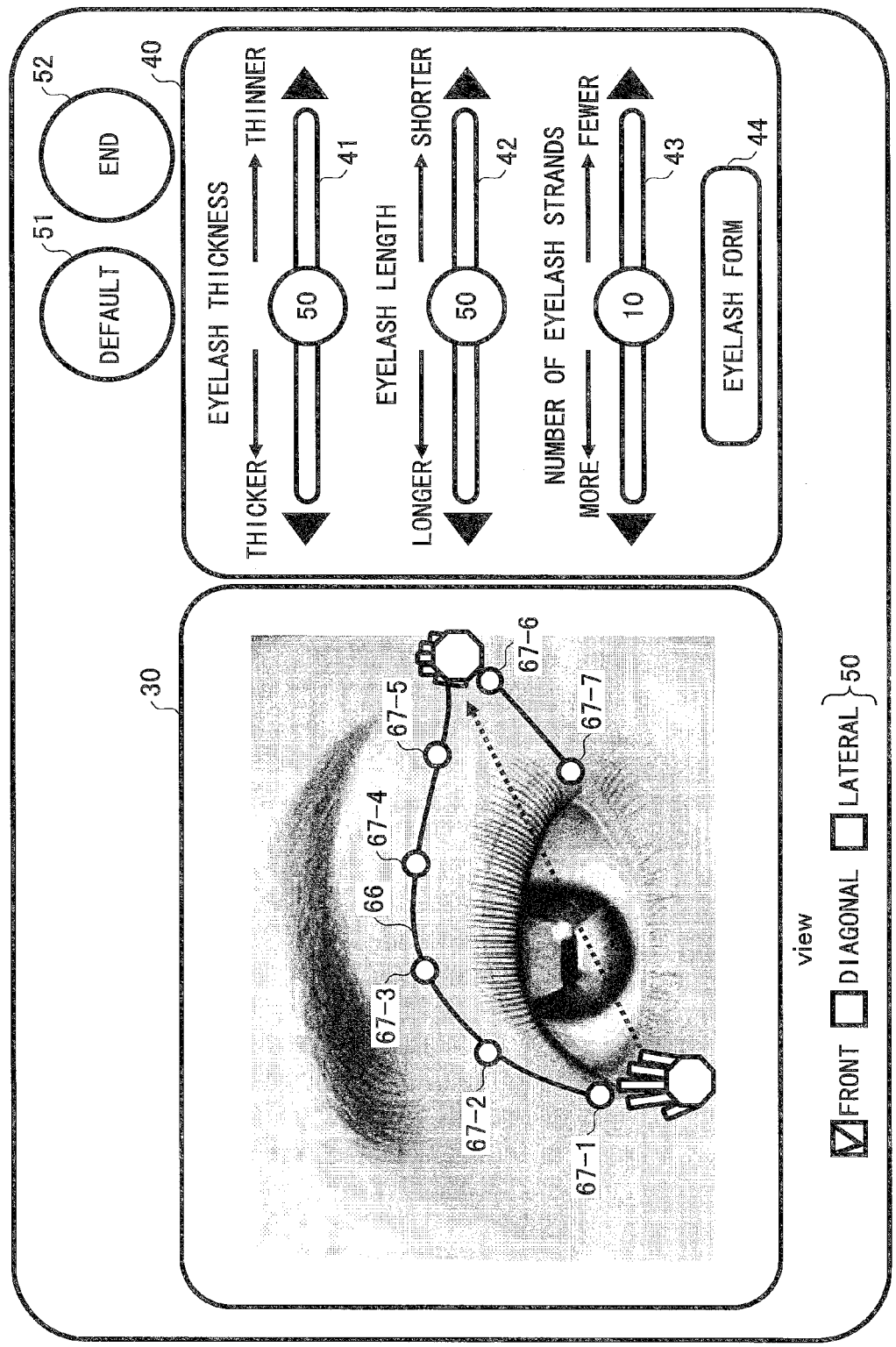
FIG. 9 is a diagram illustrating the eyelash form.

In the following, the eyelash form is described with reference to FIG. 9. FIG. 9 is a diagram illustrating an exemplary eyelash form.

In FIG. 9, the eyelash form is defined by an outer perimeter 66 that connects the tips of plural eyelashes of the upper eyelid from the inner corner of the eye to the outer corner of the eye displayed at the eye image display region 30. It is noted that the outer perimeter 66 shown in FIG. 9 represents an eyelash form that has been altered by the user.

When the form setting region 44 shown in FIG. 9 is selected by the user, the form alteration unit 16 depicts the outer perimeter 66 that connects the tips of plural eyelashes of the upper eyelid from the inner corner of the eye to the outer corner of the eye displayed at the eye image display region 30 using a predetermined function such as the spline.

That is, the form alteration unit 16 arranges points corresponding to nodes at the tips of the eyelashes of the upper eyelid from the inner corner of the eye to the outer corner of the eye and connects the points with curved splines. The form alteration unit 16 may also add new nodes so that the nodes may be spaced apart at equal distances. It is noted that the total number of nodes is preferably arranged to be a number that is obtained by subtracting one (1) from a value corresponding to two times the number of eyelash strands. For example, if the number of eyelash strands is 100 strands, 199 nodes are preferably arranged.

Then, to facilitate the four altering operations by the user, the form alteration unit 16 displays control points 67 corresponding to the nodes that are arranged at predetermined intervals along the outer perimeter 66. For example, in the case of arranging seven control points 67-1 to 67-7, two nodes may be arranged at the inner and outer corners of the eye, and five nodes may be arranged equidistantly between these two nodes.

As is shown in FIG. 9, the user may drag one or more of the control points 67 displayed along the outer perimeter 66 to alter the shape of the outer perimeter 66. In such case, the form alteration unit 16 determines the moving destination points of the tips of the eyelashes based on the displacement of the x and y coordinates of the nodes. It is noted that the displacement of the y-coordinate affects the eyelash length, and the form alteration unit 16 changes the skew value of the cone-shaped polygon 60 (y-coordinate of the polygon) in accordance with the displacement. It is noted that the change in value corresponds to the distance between the coordinate point of the eyelash tip and the moving destination point.

The displacement of the x-coordinates determines the direction of the eyelashes and is represented as an angle change on a horizontal plane. That is, the x-coordinate of the eyelash tip is shifted in the horizontal direction according to the displacement of the control point 67. It is noted that the displacement of the x-coordinates may be used by the analyzing unit 19 as eyelash angle data for analyzing the direction of the eyelashes as is described below.

Also, during the eyelash form altering operations, an icon such as a hand icon may be displayed at the eye image display region 30 of FIG. 9 to indicate to the user whether dragging operations are currently underway and/or the designated position, for example.

Figure 10:
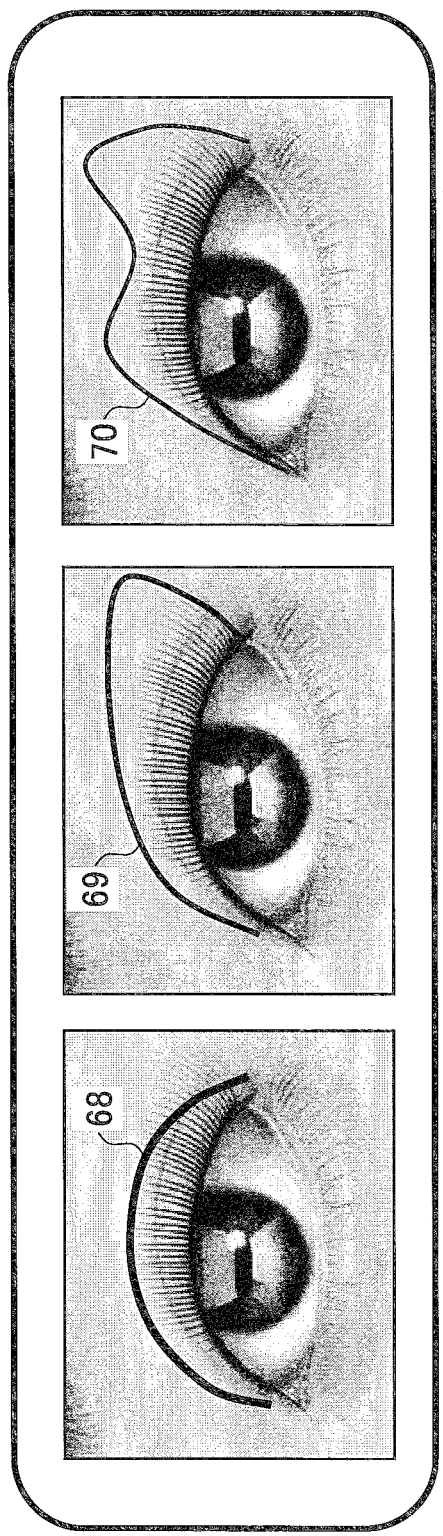
FIG. 10 is a diagram illustrating exemplary alterations of the eyelash form.

FIG. 10 is a diagram showing exemplary alterations of the eyelash form. As is shown in FIG. 10, the user may alter the eyelash form to perimeters 68-70, for example. In turn, the form alteration unit 16 may adjust the tips of the eyelashes according to the perimeters 68-70. It is noted that the altered eyelash form (in the shapes of the perimeters 68-70) is represented by x and y coordinates corresponding to parameters of the eyelash form as is described in detail below.

<Alteration of Curvature of Eyelash Curl>

Figure 11:
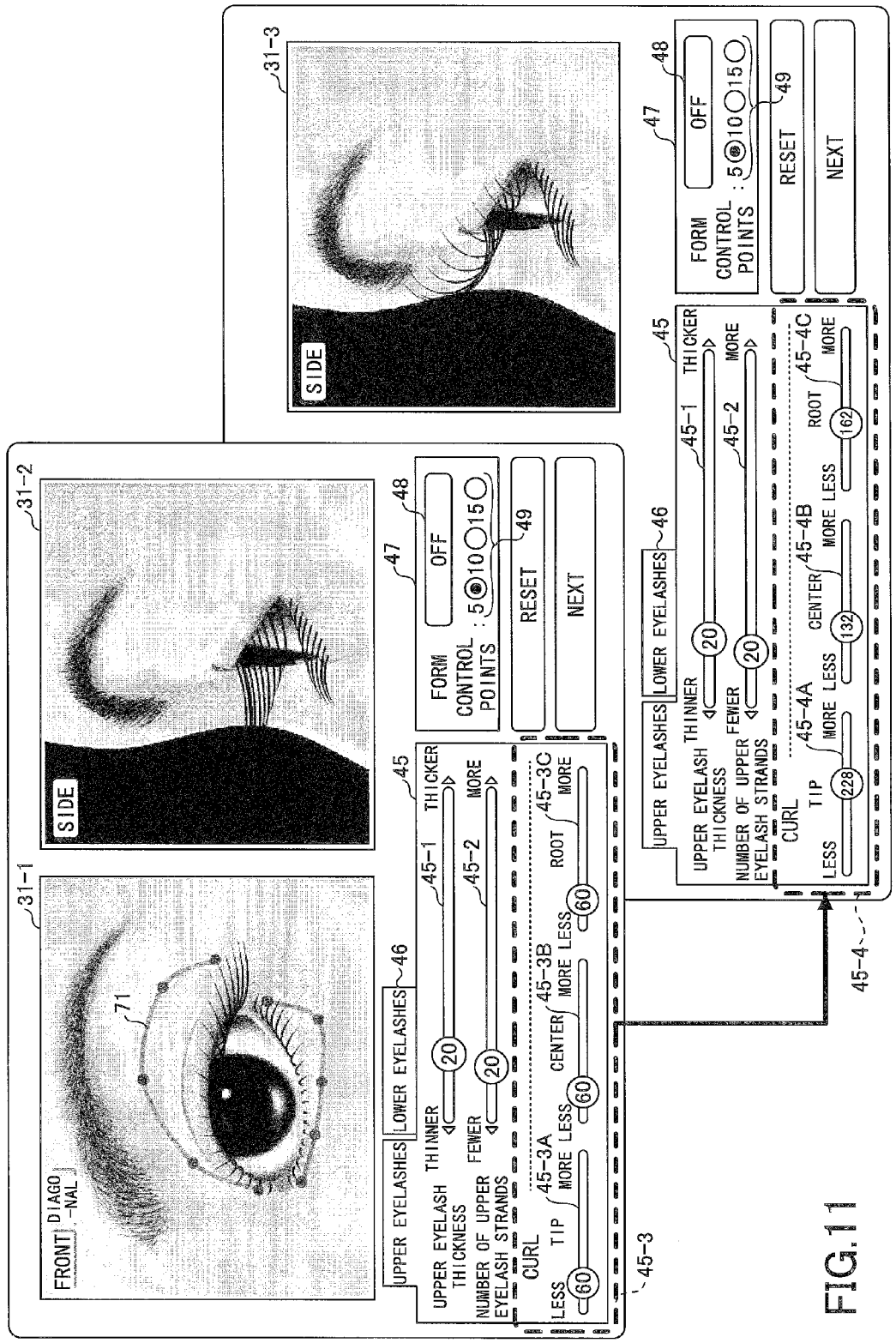
FIG. 11 is a diagram illustrating an exemplary manner of altering parameters of the curvature of the upper eyelashes.

In the following, the manner in which the curvature alteration unit 17 alters the curvature of one or more sections of upper eyelashes or lower eyelashes that have been curled section by section is described with reference to FIGS. 11 and 12. FIG. 11 is a diagram illustrating an exemplary manner of altering parameters of the curvature of the upper eyelashes. FIG. 12 is a diagram illustrating an exemplary manner of altering parameters of the curvature of the lower eyelashes.

The display screen of the eye image simulation device 10 shown in FIG. 11 displays a front view eye image display region 31-1 showing a front view eye image, a side view eye image display region 31-2 showing a side view eye image, and an upper eyelash shape setting region 45. As is shown in FIG. 11, the user may select a tab of the upper eyelash shape setting region 45 for altering the shape of the upper eyelashes, or select a tab of a lower eyelash shape setting region 46 for altering the shape of the lower eyelashes, and the setting region corresponding to the selected tab may be displayed on the display screen.

It is noted that the front view eye image display region 31-1 and the side view eye image display region 31-2 of FIG. 11 display eye images generated by the simulation image generation unit 18 that include the eyelashes with the curvature altered by the curvature alteration unit 17 based on the setting information set up at the upper eyelash shape setting region 45.

The upper eyelash shape setting region 45 shown in FIG. 11 includes a thickness setting region 45-1 for adjusting the upper eyelash thickness, a strand number setting region 45-2 for adjusting the number of upper eyelash strands, and a curl (curvature parameter) setting region 45-3 for altering the curl of the upper eyelashes.

The thickness setting region 45-1 and the strand number setting region 45-2 indicate numeric values of the corresponding attributes. When one or more of the arrows shown in these setting regions is selected by the user, the indicated numeric value(s) may be altered, and eyelashes with the thickness and number of strands adjusted according to the altered numeric value(s) may be displayed at the eye image display region 30.

Also, in the example of FIG. 11, the curl setting region 45-3 includes a tip section curl setting region 45-3A for altering the curvature of the tip section of the curl, a center section curl setting region 45-3B for altering the curvature of the center section of the curl, and a root section curl setting region 45-3C for altering the curvature of the root section of the curl.

These setting regions 45-3A to 45-3C indicate numeric values representing the curvature of the corresponding sections of the upper eyelashes. When one or more of the numeric values indicated in these setting regions is altered by the user, the curvature is altered according to the altered numeric value(s), and eyelashes with the altered curvature are displayed at the front view eye image display region 31-1 and the side view eye image display region 31-2.

For example, in a case where the numeric values are set equal to "60" at the tip section curl setting region 45-3A, "60" at the center potion curl setting region 45-3B, and "60" at the root section curl setting region 45-3C, the curl shape of the upper eyelashes as shown in the side view eye image display region 31-2 may be displayed.

On the other hand, in a case where the numeric values are altered to "228" at the tip section curl setting region 45-3A, "132" at the center potion curl setting region 45-3B, and "162" at the root section curl setting region 45-3C, the curvatures at the tip section, the center section, and the root section may be altered according to the altered numeric values, and the curl shape of the upper eyelashes reflecting the altered curvatures of the respective sections as shown in the side view eye image display region 31-3 may be displayed.

It is noted that parameters defining the curvature of the lower eyelashes may also be altered via the display screen of the eye image simulation device 10 in a manner similar to altering the curvature of the upper eyelashes as described above. In FIG. 12, the display screen of the eye image simulation device 10 displays a front view eye image display region 31-4 showing a front view eye image, a side view eye image display region 31-5 showing a side view eye image, and the lower eyelash shape setting region 46.

The front view eye image display region 31-4 and the side view eye image display region 31-5 shown in FIG. 12 display eye images generated by the simulation image generation unit 18 that include lower eyelashes having curvatures altered by the curvature alteration unit 17 based on the setting information set up at the lower eyelash shape setting region 46.

In the example of FIG. 12, the lower eyelash shape setting region 46 includes a thickness setting region 46-1 for adjusting the lower eyelash thickness, a strand number setting region 46-2 for adjusting the number of lower eyelash strands, and a curl (curvature parameter) setting region 46-3 for adjusting the curl of the lower eyelashes.

Also, the curl setting region 46-3 includes a tip section curl setting region 46-3A for adjusting the curvature of the tip section curl of the lower eyelashes, a center section curl setting region 46-3B for adjusting the curvature of the center section curl of the lower eyelashes, and a root section curl setting region 46-3C for adjusting the curvature of the root section curl of the lower eyelashes.

These setting regions 46-3A to 46-3C indicate numeric values representing the curvature of the corresponding sections of the lower eyelashes. When one or more of the numeric values indicated in these setting regions is altered by the user, the curvature is altered according to the altered numeric value(s), and lower eyelashes with the altered curvature are displayed at the front view eye image display region 31-4 and the side view eye image display region 31-5.

As is described above, the curvature alteration unit 17 divides the upper eyelashes or the lower eyelashes generated by the eyelash generation unit 15 into sections such as a root section, a center section, and a tip section, and alters the curvature of at least one of the root section, the center section, and/or the tip section of the eyelashes.

It is noted that the curvature alteration unit 17 may also alter the curvature of one or more of the sections of the upper eyelashes or lower eyelashes that have forms altered by the form alteration unit 16. For example, the front view eye image display region 31-1 shown in FIG. 11 indicates an outer perimeter 71 of the upper eyelashes for altering the form of the upper eyelashes. Also, the front view eye image display region 31-4 shown in FIG. 12 indicates an outer perimeter 81 of the lower eyelashes for altering the form of the lower eyelashes.

For example, the user may alter the form of the upper eyelashes or the lower eyelashes using control points depicted along the outer perimeter 71 of the upper eyelashes displayed at the front view eye image display region 31-1 or control points depicted along the outer perimeter 81 of the lower eyelashes displayed at the front view eye image display region 31-4. Also, the curvature of the upper eyelashes or the lower eyelashes that have forms altered in the above manner may be altered using the curl setting regions described above.

As is described above, in the case of altering the curvature of the upper eyelashes or the lower eyelashes of an eyelash form altered by the form alteration unit 16, the curvature alteration unit 17 fixes the x coordinates and y coordinates of the tips of the corresponding eyelashes configuring the form and alters one or more sections of the corresponding eyelashes in this state.

Also, as is shown in FIGS. 11 and 12, the display screen may display a form setting screen 47 that includes an "OFF" button for prompting the display of the outer perimeter 71 of the upper eyelashes or the outer perimeter 80 of the lower eyelashes to be turned off. Also, the form setting region 47 may include a control point number selection region 49 for enabling selection of the number of control points to be displayed along the outer perimeter 71 of the upper eyelashes or the outer perimeter 80 of the lower eyelashes. By increasing the number of control points, the eyelash form may be adjusted in greater detail, for example.

<Numeric Data and Analysis Method>

In the following, numeric data obtained from the eye image generated in the above manner and analysis of the eye image are described. The analyzing unit 19 obtains parameter values of various attributes such as "eyelash thickness," "eyelash length," "number of eyelash strands," "eyelash curl (curvature)," and "eyelash form," for example.

As for the "eyelash thickness" and "eyelash length," a corresponding parameter value may be obtained from one strand of eyelash included in the eye image. As for the "number of eyelash strands," a corresponding parameter value may be obtained from one eye image. For example, the analyzing unit 19 may represent the obtained parameter values in the form of a numeric value distribution graph.

As for the "eyelash curl," three values; i.e., "Skew," "Bend," and the ratio "Skew/Bend" for determining the curvature of the eyelash, may be obtained from one strand of eyelash. Accordingly, the analyzing unit 19 may represent the obtained parameter values for the "Skew" and "Bend" in the form of a scatter graph with the vertical and horizontal axes representing the values of the "Skew" and "Bend," respectively, for example. The analyzing unit 19 may represent the parameter value of the ratio "Skew/Bend" in the form of a numeric value distribution graph, for example.

<Form Analyzing Method>

In the following, a method of analyzing the eyelash form is described with reference to FIGS. 13A and 13B.

Figure 13A:
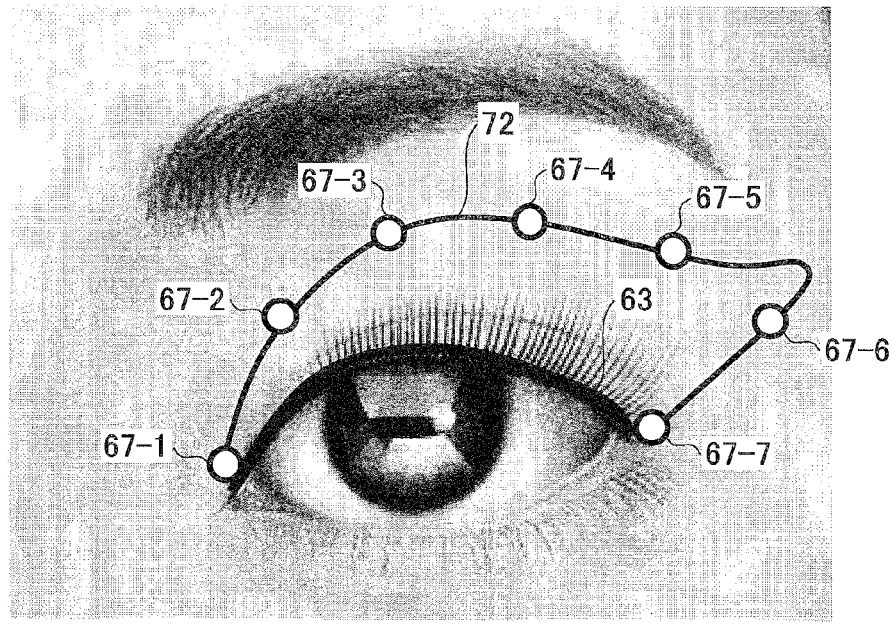
FIGS. 13A and 13B are diagrams illustrating a method of analyzing the eyelash form.

An eyelash form 72 shown in FIG. 13A may be represented as a parameter by an x-y coordinate system (two-dimensional matrix), for example.

Figure 13B:
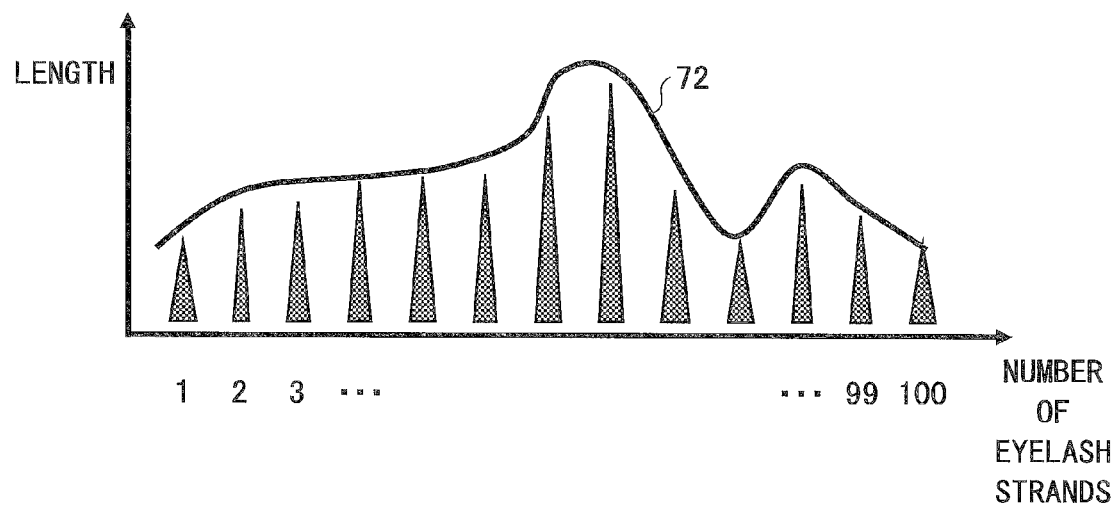

As is shown in FIG. 13B, for example, in analyzing the eyelash form 72, the analyzing unit 19 may have the positions of the eyelashes along the border between the upper eyelid or lower eyelid and the eye such as line 63 shown in FIG. 13A laid out horizontally as the lateral axis and plot the x-coordinates of the tips of the eyelashes along the lateral axis. Also, the analyzing unit 19 may plot values of the "eyelash tip y-coordinate to eyelash root y-coordinate" corresponding to the eyelash length along the vertical axis to depict a graph of frequency distribution as a numeric representation of the eyelash fonts 72.

Based on the numeric representation of the eyelash form 72, the analyzing unit 19 may obtain the average value of the eyelash lengths, the most frequently occurring eyelash length, the variance for determining length uniformity, the maximum value and the minimum value of the eyelash length, and the range corresponding to the difference between the maximum value and the minimum value, for example. Based on these values, the analyzing unit 19 may determine a general tendency of the eyelash lengths and determine characteristic parts by identifying the x-coordinate distribution where the lengths are largely at the average value and/or the x-coordinate distribution where the lengths are largely at the most frequently occurring value, for example.

Also, with respect to the overall shape of the eyelashes, the analyzing unit 19 may determine whether a greater changes are made at the inner corner side or outer corner side of the eye based on the slope ratio of the form 72, determine whether the form 72 is skewed towards the inner corner side or outer corner side of the eye based on the skewness of the form 72, and determine whether the form 72 is peaked or level based on the kutosis of the form 72. Further, a change of the form 72 may be regarded as part of an oscillation waveform and the FFT (Fast Fourier Transform) may be applied to conduct a frequency analysis to identify a substantial form change from the eyelash length of form 72 as a low frequency component and a fine form change as a high frequency component, for example.

As is described above, the analyzing unit 19 may quantify an overall eyelash finish by representing the form 72 in numeric values. The analyzing unit 19 may also divide the form 72 into separate parts such as the inner corner part, center part, and the outer corner part of the eye, and analyze these parts individually, for example.

Also, in certain embodiments, the parameters configuring the eyelash shape may be arranged into pairs, for example, and mapped on a distribution graph so that preferences may be analyzed from various perspectives.

As can be appreciated, according to an aspect of the present invention, the eyelash shape may be freely changed to generate an eye image and the generated eye image may be used to conduct a user preference survey with respect to a mascara finish in a simple manner at low cost. For example, a mascara finish preference may be quantified using numeric values representing the length, thickness, number of strands, curl, and overall form of the eyelashes, and the quantified data may be numerically analyzed. Also, an image of a finish reflecting these numeric values may be represented.

Also, by defining parameters of the eyelash angle on a horizontal plane (e.g., rotation angle with respect to the root), the volume of a bunch of eyelashes (number of strands of the bunch), the eyelash thickness at different eyelash parts, and/or the curl at different eyelash sections (e.g., root, center, and tip), for example, the eyelash shape may be adjusted and represented more freely.

Also, images of the eye from various aspects may be displayed by enabling adjustment of the degree of openness or blinking of the eye, for example. Further, by enabling adjustment of eye-related information such as the skin color, the eye color, and the eyelid shape (e.g., single-edged or double-edged) for configuring the background image of the eye image, more global adjustments and accommodations may be made, and user mascara preferences according to individual differences such as the eyelid shape may be analyzed, for example.

Also, principles of eye shadows may be incorporated to change the color and texture of the eyelid so that the impression of the eye may be more realistically reproduced in analyzing mascara preferences, for example.

Further, the present invention is not limited to the embodiments described above, and numerous variations and modifications may be made without departing from the scope of the present invention.

The present application is based on and claims the benefit of priority of Japanese Patent Application No. 2010-162040 filed on Jul. 16, 2010 and Japanese Patent Application No. 2011-150985 filed on Jul. 7, 2011, the entire contents of which are herein incorporated by reference.

DESCRIPTION OF THE REFERENCE NUMERALS

10 Eye image simulation device
11 Input unit
12 Output unit
13 Recording unit
14 Setting unit
15 Eyelash generation unit
16 Form alteration unit
17 Curvature alteration unit
18 Simulation image generation unit
19 Analyzing unit
20 Control unit
21 Input device
22 Output device
23 Drive device
24 Auxiliary storage device
25 Memory device
26 Central processing unit
27 Network connection device
28 Recording medium
30, 31-1 to 31-5 Eye image display region
40 Eyelash shape setting region
41, 45-1, 46-1 Thickness setting region
42 Length setting region
43, 45-2, 46-2 Strand number setting region
44, 47 Form setting region
45 Upper eyelash shape setting region
45-3, 45-4, 65 Curl setting region
45-3A, 45-4A, 46-3A Tip section curl setting region
45-3B, 45-4B, 46-3B Center section curl setting region
45-3C, 45-4C, 46-3C Root section curl setting region
46 Lower eyelash shape setting region
47 OFF button
48 Control point number selection region
50 View selection region
51 Default selection region
52 End selection region
60 Cone-shaped polygon
61 Radius
62 Height
63 Line
64 Length
66, 68-70 Outer perimeter
67 Control point
71 Outer perimeter of upper eyelashes
72 Form
80 Outer perimeter of lower eyelashes

The invention claimed is:

1. An eye image simulation device that generates an eye image using information relating to an eyelash shape set up by a user, the eye image simulation device comprising:
an eyelash generation unit that generates an eyelash with a polygon using the information relating the eyelash shape;
a form alteration unit that alters a form that is configured by connecting tips of the eyelashes generated by the eyelash generation unit; and
a simulation image generation unit that generates the eye image using at least one of the eyelashes generated by the eyelash generation unit and the form altered by the form alteration unit, wherein when a form setting region is selected on a display screen of the eye image simulation device, the form alteration unit depicts an outer perimeter line that connects the tips of the eyelashes of an eyelid from an inner corner of an eye to an outer corner of the eye displayed at an image display region using a spline function, and wherein the form alteration unit determines whether the outer perimeter line has been altered by the user and alters an eyelash length and an eyelash direction according to the altered outer perimeter line upon determining that the outer perimeter line has been altered by the user.

2. The eye image simulation device as claimed in claim 1, further comprising:

a curvature alteration unit that alters a curvature of at least one section of at least one of upper eyelashes and lower eyelashes that are curled section by section, the upper eyelashes and the lower eyelashes including at least one of upper eyelashes and lower eyelashes generated by the eyelash generation unit, and upper eyelashes and lower eyelashes of the altered form generated by the form alteration unit; wherein the simulation image generation unit generates the eye image using the curvature altered by the curvature alteration unit.

3. The eye image simulation device as claimed in claim 2, wherein the curvature alteration unit divides at least one of the upper eyelashes and the lower eyelashes into a root section, a center section, and a tip section, and alters the curvature of at least one of the root section, the center section, and the tip section.

4. The eye image simulation device as claimed in claim 1, further comprising:

an analyzing unit that analyzes the eyelash shape through numerical analysis based on the eye image generated by the simulation image generation unit.

5. The eye image simulation device as claimed in claim 1, wherein the information relating to the eyelash shape includes information relating to an eyelash thickness, an eyelash length, a number of eyelash strands, an eyelash curvature, and an eyelash form.

6. The eye image simulation device as claimed in claim 1, wherein the form alteration unit arranges points corresponding to nodes at the tips of the eyelashes of the eyelid from the inner corner of the eye to the outer corner of the eye and connects the points, a total number of nodes is set to be a number that is obtained by subtracting one from a value corresponding to two times a number of eyelash strands.

7. An eye image generation method that is executed by an eye image simulation device that generates an eye image using information relating to an eyelash shape set up by a user, the eye image generation method comprising:

an eyelash generation step of generating an eyelash with a polygon using the information relating to the eyelash shape;

a form alteration step of altering a form that is configured by connecting tips of the eyelashes generated by the eyelash generation step; and a simulation image generation step of generating the eye image using at least one of the eyelashes generated by the eyelash generation step and the form altered by the form alteration step, wherein when a form setting region is selected on a display screen of the eye image simulation device, the form alteration step includes depicting an outer perimeter line that connects the tips of the eyelashes of an eyelid from an inner corner of an eye to an outer corner of the eye displayed at an image display region using a spline function, and wherein the form alteration step determines whether the outer perimeter line has been altered by the user and alters an eyelash length and an eyelash direction according to the altered outer perimeter line upon determining that the outer perimeter line has been altered by the user.

8. The eye image generation method as claimed in claim 7, further comprising:

a curvature alteration step of altering a curvature of at least one section of at least one of upper eyelashes and lower eyelashes that are curled section by section, the upper eyelashes and the lower eyelashes including at least one of upper eyelashes and lower eyelashes generated by the eyelash generation unit, and upper eyelashes and lower eyelashes of the altered form generated by the faint alteration unit; wherein the simulation image generation step includes generating the eye image using the curvature altered by the curvature alteration step.

9. The eye image generation method as claimed in claim 8, wherein the curvature alteration step includes dividing at least one of the upper eyelashes and the lower eyelashes into a root section, a center section, and a tip section, and altering the curvature of at least one of the root section, the center section, and the tip section.

10. The eye image generation method as claimed in claim 7, further comprising:

an analyzing step of analyzing the eyelash shape through numerical analysis based on the eye image generated by the simulation image generation unit.

11. The eye image generation method as claimed in claim 7, wherein the information relating to the eyelash shape includes information relating to an eyelash thickness, an eyelash length, a number of eyelash strands, an eyelash curvature, and an eyelash form.

12. A non-transitory computer readable medium having a program stored thereon that is executable by a computer to cause the computer to execute an eye image generation program for generating an eye image using information relating to an eyelash shape set up by a user, the eye image generation program comprising computer executable code for causing the computer to function as:

an eyelash generation unit that generates an eyelash with a polygon using the information relating the eyelash shape;

a form alteration unit that alters a form that is configured by connecting tips of the eyelashes generated by the eyelash generation unit; and a simulation image generation unit that generates the eye image using at least one of the eyelashes generated by the eyelash generation unit and the form altered by the form alteration unit, wherein when a form setting region is selected on a display screen of the computer, the form alteration unit depicts an outer perimeter line that connects the tips of the eyelashes of an eyelid from an inner corner of an eye to an outer corner of the eye displayed at an image display region using a spline function, and wherein the form alteration unit determines whether the outer perimeter line has been altered by the user and alters an eyelash length and an eyelash direction according to the altered outer perimeter line upon determining that the outer perimeter line has been altered by the user.

13. The non-transitory computer readable medium as claimed in claim 12, further comprising computer executable code for causing the computer to function as:
- a curvature alteration unit that alters a curvature of at least one section of at least one of upper eyelashes and lower eyelashes that are curled section by section, the upper eyelashes and the lower eyelashes including at least one of upper eyelashes and lower eyelashes generated by the eyelash generation unit, and upper eyelashes and lower eyelashes of the altered form generated by the form alteration unit; wherein
- the simulation image generation unit generates the eye image using the curvature altered by the curvature alteration unit.

14. The non-transitory computer readable medium as claimed in claim 13, wherein
- the curvature alteration unit divides at least one of the upper eyelashes and the lower eyelashes into a root section, a center section, and a tip section, and alters the curvature of at least one of the root section, the center section, and the tip section.

15. The non-transitory computer readable medium as claimed in claim 12, further comprising computer executable code for causing the computer to function as:
- an analyzing unit that analyzes the eyelash shape through numerical analysis based on the eye image generated by the simulation image generation unit.

16. The non-transitory computer readable medium as claimed in claim 12, wherein
- the information relating to the eyelash shape includes information relating to an eyelash thickness, an eyelash length, a number of eyelash strands, an eyelash curvature, and an eyelash form.

* * * * *